March 1, 1960 P. J. PENNINGTON 2,927,314
DROPPABLE MARKER LIGHT
Filed March 23, 1959 3 Sheets-Sheet 1
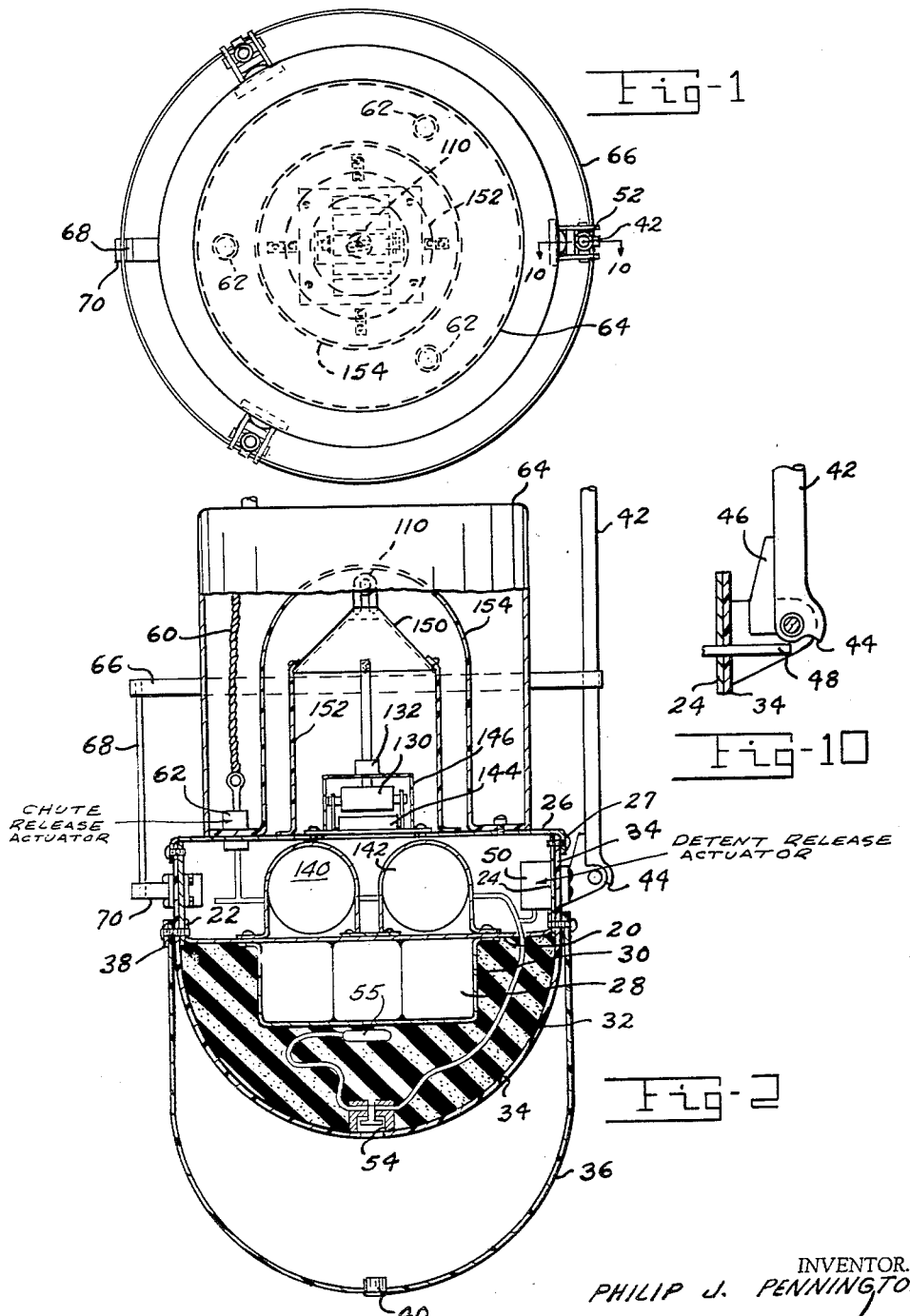
INVENTOR.
PHILIP J. PENNINGTON
BY Wade Koontz
S. A. Strickle
ATTORNEYS

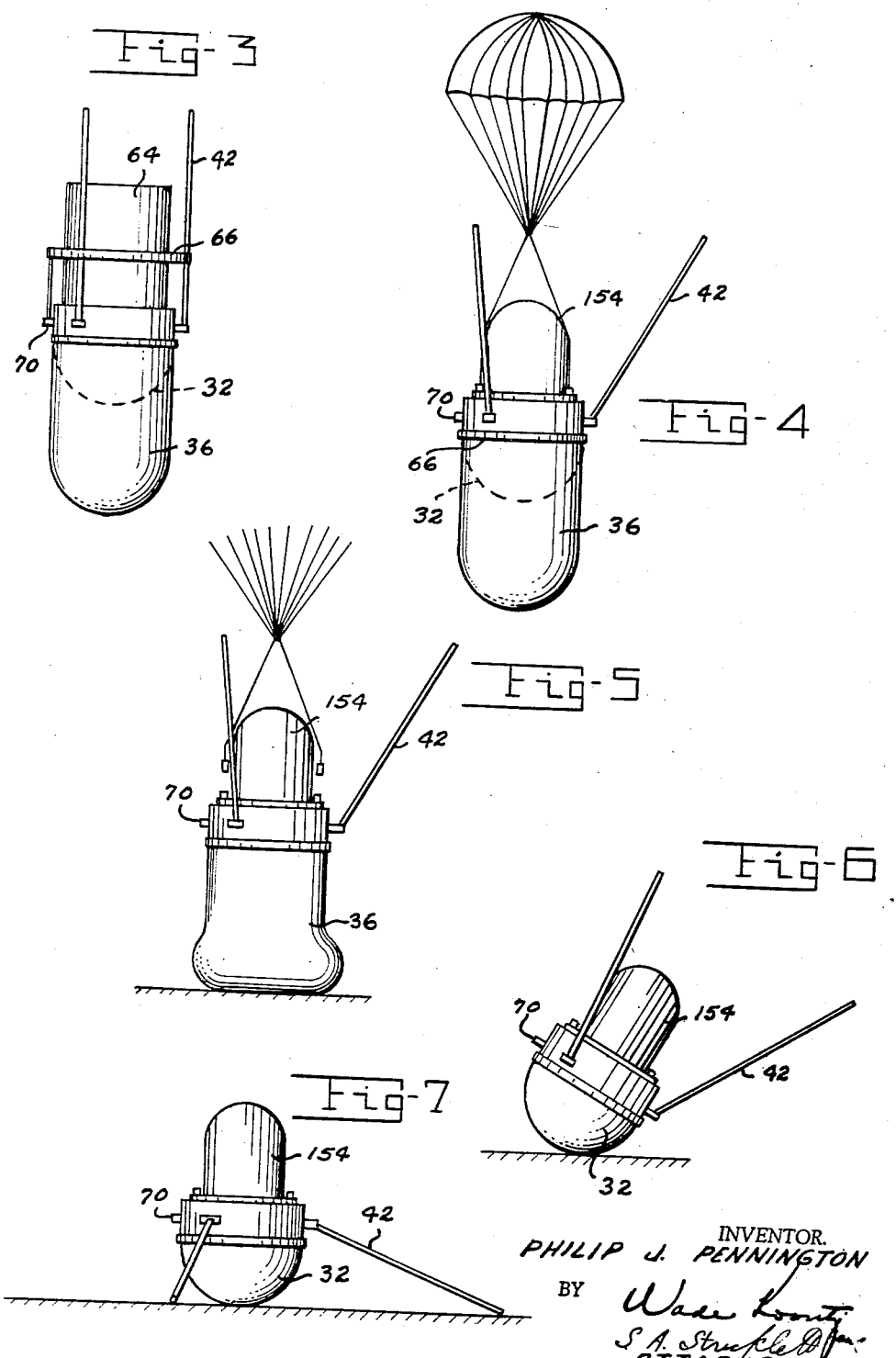

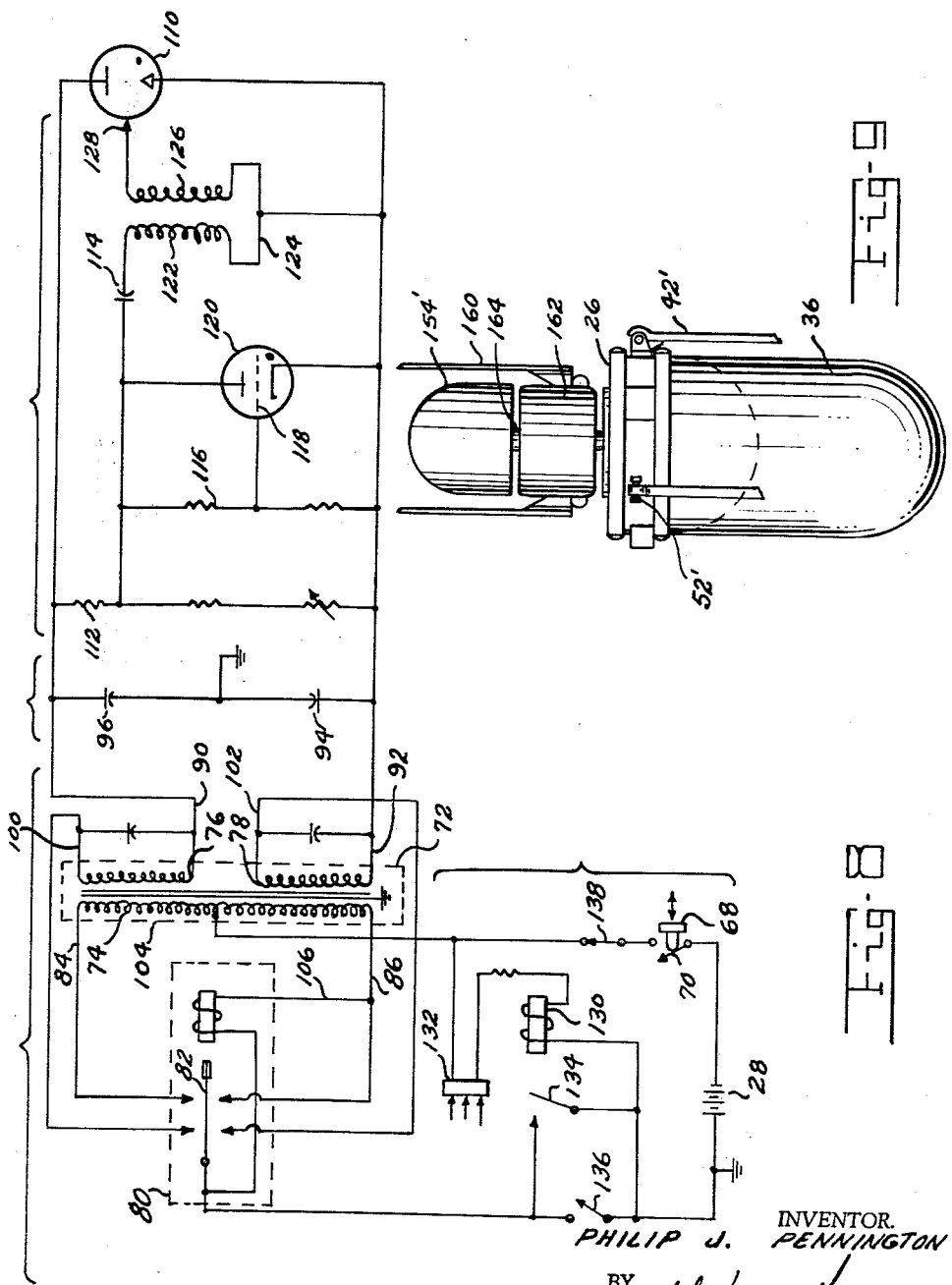

United States Patent Office 2,927,314
Patented Mar. 1, 1960

2,927,314

DROPPABLE MARKER LIGHT

Philip J. Pennington, Dayton, Ohio, assignor to the United States of America as represented by the Secretary of the Air Force Application March 23, 1959, Serial No. 801,423

6 Claims. (Cl. 340—366)

This invention relates to a droppable light and particularly to such a light adapted to be dropped from an aircraft onto any surface without material damage to the light and having the light oriented for proper display.

In the operation of rescue and supply missions it is frequently desirable to leave a marker light so that aircraft may return to the exact spot or that ground parties may find the dropped supplies. Considerable difficulty has been encountered in dropping marker lights either in that the lights are damaged by contact with the earth or are inverted or otherwise positioned so that the light is not visible from the proper angle. Also, the battery or other energy source is frequently expended during daylight hours when it does little good and is therefore inadequate after dark when most needed.

In the construction according to the present invention a marker light is provided with a substantially rigid base on which the elements of the light are mounted with a roly-poly cushion bottom so that the light may be moved to upright oposition from any angle it may assume and supporting members are hingedly mounted to the base member and biased to proper angular position to support the base plate in a substantially level position on the roly-poly bottom. In order to operate on water as well as on any land surface a suitably watertight float chamber is provided on the base member and the circuit elements of the device are enclosed in the float chamber while a supply battery or other energy source is mounted on the bottom side of the base member to provide a desired weight distribution to maintain the roly-poly bottom downward either on land or in water. For purposes of preventing damage by shock an extended inflatable air bag is mounted on the base member surrounding the roly-poly bottom and extended axially therefrom. The air bag is provided with a contact valve so that when the light falls on the air bag the light will be cushioned thereby but the valve will be operated by the contact to deflate the air bag and thus allow the light to rest on the roly-poly bottom. In order to decrease the rate of fall a suitable retarding device such as a normal chute or a roto chute may be detachably connected to the light. In order to prevent sail effects of the chute after landing and also for actuating the supporting members, an impact valve is provided in the roly-poly bottom and is responsive to a high pressure in the air bag on its impact with any surface to actuate a release device to detach the chute member and to release the support members for motion to the proper supporting position for the light structure. The flashing tube is mounted in spaced relation above the float chamber and is provided with an inverted frusto conical reflector preferably of a light plastic material. A photosensitive device is mounted on the float chamber to control the circuit mechanism supplying energy from the battery to the flasher tube to conserve energy by disconnecting the circuit during a predetermined light level. The flasher tube and its supporting elements together with the photosensitive device are protected by a lightweight plastic dome.

It is accordingly an object of the invention to provide an improved marker light.

It is a further object of the invention to provide a marker light having an improved landing cushion.

It is another object to provide an energy conserving marker light system.

It is a further object of the invention to provide a marker light which will readily adjust itself to the proper upright position.

It is still another object of the invention to provide a marker light which may be readily dropped and be self-adjusting after dropping.

Other objects and advantages of the invention will be apparent from the following detailed description taken in conjunction with the accompanying drawings, in which.

Fig. 1 is a top plan view of the marker light in storage condition;

Fig. 2 is a front elevation view of the light with parts broken away and in section;

Figs. 3 to 7 illustrate the sequence of operation of light from instant of drop to final ground position;

Fig. 8 is a schematic wiring diagram of the lamp actuating circuit;

Fig. 9 is a front elevation of a light utilizing a roto chute instead of the conventional chute; and Fig. 10 is a detail of the support mounting.

In an exemplary embodiment according to the invention a substantially circular base plate 20 is provided with an upstanding edge 22 to which is connected a substantially cylindrical spacing member 24 which is sealed by a cover member 26. Preferably the members 20, 24 and 26 are connected in watertight relation. A battery 28 is mounted on the bottom side of the base 20 by means of a casing 30. Preferably the casing 30 is connected in watertight connection to the base 20. A roly-poly cushion 32 preferably constructed of sponge rubber or such light elastic material is mounted on the bottom side of the base 20 and together with the base 20 substantially encloses the housing 30 enclosing the batteries 28. A plastic covering 34 is connected to the base 20 and extends upwardly along the member 24 for engagement under the lip 27 of cover 26 and extends over the roly-poly bottom to substantially provide a waterproof sealing around the bottom. Normally the roly-poly bottom 32 will be substantially semispherical or at least a spherical section, although, obviously other curved sections could be utilized.

An air bag 36 is connected to the base 20 by means of a connecting band 38 with the bag 36 being constructed of elastic material so that it can be distended substantially axially of the bottom to provide an air cushion between the bottom 32 and the extended end of the air bag 36. A contact valve 40 is placed in the end of the air bag 36 so that when the valve 40 comes in contact with any surface the valve will be opened to permit escape of air from the air bag so that the light will rest on the bottom 32. In order to properly orient the device on any surface a plurality of support members or legs 42 are hingedly mounted around the periphery of the base, preferably on the cylindrical member 24. The supporting members 42 are provided with stop members 44 which engage the bottom of a combined stop 46 to determine the angle of deviation of the supporting members 42 with respect to the base member 20. In order to prevent premature extension of the support members 42 a detent 48 is mounted in a suitable pneumatic actuator 50 and extends into the path of the stop 44 so that the air bag 36 will strike the ground before the support members. In order to release the support members for proper actuation by the biasing springs 52 a pressure actuated valve 54 is placed in the bottom 32 in communication with the space within the air bag 36 so that upon contact with the earth the pressure shock in the bag 36 will actuate the valve 54 which controls a fluid from pressure container 55 to be applied to the controls 50 so that the detents 48 will be withdrawn allowing the stop 44 to move into engagement with the aforementioned stop member 46.

In order to properly retard the fall of the light it is desirable to provide a suitable chute member. In Figs. 1 to 7 the chute member is indicated as of the usual fabric or cloth type attached by suitable shroud lines 60 to detachable retainer 62 which will also be actuated by bottom shock valve 54 so that on contact of the light with the earth the chute will be released so that there will be no danger of the chute dragging or displacing the light after contact with the earth.

Preferably the chute is stored in a suitable bag or housing 64 which is in contact with the cover member 26 and houses the light proper presently to be described. The bag or housing 64 has attached to it a fastening ring 66 which retains the supporting members 42 in a stored or retracted position during normal handling so that the light will be stored in a reasonable space. Also connected to the ring 66 is a plug 68 for actuating a switch 70 so that the supply circuit for the light will be actuated when the bag 64 is stripped from the device to allow the chute to open. Preferably the bag is removed by a static line after the device is launched from a suitable rack or by hand.

The actuating circuit for the light comprises in addition to the battery 28 and the plug switch 70, a power converter comprising a transformer 72 having a primary winding 74 and a pair of secondary windings 76 and 78.

The flow of power from the battery 28 through the primary winding 74 is controlled by means of a vibrator rectifier 80. The vibrating arm 82 of the vibrator 80 successively connects the ends 84 and 86 with the battery 28 to cause alternate current impulses to flow in the portions 104, 106 of the winding 74. The windings 76 and 78 have their similarly based terminals 90 and 92 connected to the capacitors 94 and 96 which are connected to ground intermediate the capacitors 94 and 96. The ends 100 and 102 of the windings 76 and 78 are arranged for contact with the vibrator arm 82 so that when current flows through the portion 104 of the primary winding 74 the terminal 100 will be connected to vibrator arm 82 and current will flow from the winding 76 through the capacitor 96 to ground to provide a charge on capacitor 96 on the alternate half cycle when current flows through the portion 106 of winding 74, terminal 102 will be grounded to vibrator arm 82 and current will flow through the capacitor 94 to ground. Because of the opposite connections of the terminals 90 and 92, capacitors 94 and 96 will be charged in the same direction so that the total charge will appear across the load circuit. The load circuit comprises a flasher lamp 110 connected across the capacitors 94 and 96. A voltage divider 112 is connected across the capacitors 94 and 96 to provide a charging voltage for a trigger capacity 114. A second voltage divider 116 divides the voltage across the capacitor 114 so that when the capacitor 114 has been sufficiently charged the grid 118 will actuate the trigger tube 120 to discharge the capacitor 114 through the primary winding 122 of a trigger coil 124 which will induce a peak voltage in the secondary winding 126 to apply a trigger voltage to trigger 128 of flasher tube 110.

In order to conserve energy it is desirable to turn off the flasher in the daytime and accordingly a relay 130 is controlled by a photosensitive device 132 so that when sufficient light is received by device 132 the relay will open the switch 134 and prevent actuation of a light, however, it may be desirable under some circumstances to operate the light when the photocell is operative to cut it off and for this reason a shunt switch 136 is provided for bypassing the relay switch 134.

A manual switch 138 is provided in series with the plug switch 70 so that the entire system may be manually deactivated, if desired.

The power converter equipment is preferably stored in a pair of substantially cylindrical housings 140 and 142 mounted in the float chamber and above the base 20, preferably the containers 140 and 142 are rigidly secured on the base 20 to prevent dislodgment by rough handling. The trigger and timing circuits are housed in a casing 144 within a housing 146 mounted on the cover 26 and preferably in watertight relation therewith. The relay 130 is likewise mounted in the housing 146 and the photo-sensitive device 132 is preferably mounted on the top of the housing 146.

The flasher tube 110 is mounted in spaced relation to the plate 26 and preferably above an inverted reflector 150 mounted on the plate 26 by a plurality of legs 152. Preferably the reflector 150 and the legs 152 are constructed of suitable light plastic. The reflector 150 may be silvered for higher efficiency. The flasher tube 110 and its support members are contained in a plastic dome 154 which is sealed in watertight relation to the plate 26.

In the modification according to Fig. 9 the conventional chute has been replaced by a roto chute the planes 160 of which are pivoted on a housing 162 rotatable on a shaft 164 extending between the plate 26 and a dome 154' housing the flasher tube.

In order to be out of the way of the roto blades 160 support members 42' are extended downward and urged by a spring 52' upwardly to supporting position. In order to prevent breaking or bending of the support members 42' they may be constructed as telescoping members with either a compressible fluid or a spring received therein so that after a landing they will telescope out of danger and then re-extend to orient the light in proper relation.

In utilization, the device will be packaged as shown in Fig. 3 so that it may be launched either from a launching leg or by hand and the chute bag 64 will be attached or controlled by a static line, not shown, so that after the light is safely launched the chute bag 64 will be removed releasing the chute and simultaneously actuating the plug switch 70 and release the support members 42 for the initial displacement of the supports 42 until the stop 44 engages the detents 48. In this position the device will fall until the bag 36 contacts the earth at which time the compression of the air within the bag 36 will actuate the valve 54 releasing the chute and the detents 48 so that the support members 42 will be urged by the spring 52 to ground engaging position. Because of the escape of the air from the bag 36 the device will be supported on the roly-poly bottom 32 so that the support members 42 will readily orient the base 20 to a proper horizontal position with the light 110 extending upwardly. If the device is unattended the flasher tube 110 will be actuated at all times when there is not sufficient light to cause actuation of the relay 130.

Modification of Fig. 9 will operate in substantially the same manner except that the roto wings 160 will be lowered to supporting position by a suitable spring bias mechanism, not shown. Obviously, if desired the roto wings 160 may be detached in the same manner as the conventional chute mounted in the conventional manner.

For purposes of exemplification particular embodiments of the invention have been shown and described according to the best present understanding thereof, however, it will be apparent to those skilled in the art that various changes and modifications in the construction and arrangements of the parts thereof may be readily resorted to without departing from the true spirit and scope of the invention.

It is claimed:

1. In a droppable marker light having a base, a flash tube mounted above said base and an electrical supply system for said lamp mounted on said base, a landing system comprising a cushion mounted on the bottom of said base, the outer surface of said cushion being substantially a spherical section, an air bag attached to said base and enclosing said cushion, said bag being inflatable to provide an air cushion on said light, an exhaust valve in the end of said bag, said valve opening on contact with the ground.

2. In a droppable marker light having a base, a flash tube mounted in spaced relation above said base, a battery mounted on the under side of said base, a control circuit connecting said battery to said tube, a landing system comprising a deformable insulating member mounted on said base and embedding said battery, the outer surface of said insulating member being substantially a spherical segment, an air bag attached to said base, said air bag substantially enclosing said insulating member and extending in axially spaced relation thereto, a valve in said air bag, said valve opening in response to landing contact for deflating said air bag.

3. In a marker light having a battery, a power converter, a flash tube and timing and trigger circuit means connecting said converter to said flash tube, a light positioning support comprising a base member, means for mounting said battery on the bottom of said base, a float chamber mounted on the top of said base, a frusto conical reflector mounted in spaced relation to said base and said chamber, mounting means for supporting the tube above said reflector, a convex insulating cushion on the bottom of said base, a plurality of support members hingedly mounted on said base, biasing means urging said support members into ground engaging position.

4. In a droppable marker light having a base plate, a light tube mounted above the base and an electrical supply system including a battery mounted below the base, a shock absorbing system comprising a resilient cushion mounted on the bottom of said base, the outer surface of said cushion being substantially a spherical segment, an air bag attached to said base and extending axially of said cushion, an exhaust valve in the end of the bag remote from said base, said valve opening in response to landing contact to deflate said bag.

5. In a droppable marker light having a base plate, a light tube mounted above the base and an electrical supply system including a battery mounted below the base, a shock absorbing system comprising a resilient cushion mounted on the bottom of said base, the outer surface of said cushion being substantially a spherical segment, an air bag attached to said base and extending axially of said cushion, an exhaust valve in the end of the bag remote from said base, said valve opening in response to landing contact to deflate said bag, a plurality of support members hingedly mounted on said base, means urging said support members into ground engaging position, detent means engaging said members for preventing rotation of said members into ground engaging position, a pneumatic release actuator for each of said detents, a valve responsive to pressure in said bag for energizing said release actuators.

6. An orienting system, for a droppable marker light having a base, a flash tube mounted in spaced relation above said base and a battery mounted on the underside of said base, comprising a deformable insulating member mounted on said base and embedding said battery, the outer surface of said insulating member being substantially a spherical segment, an air bag attached to said base, said air bag substantially enclosing said insulating member and extending in axially spaced relation thereto, a contact responsive valve in the end of said air bag, said valve opening on contact with the ground for deflating said air bag, a plurality of supports hingedly mounted on said base, biasing means urging said supports into ground contacting position, detents holding said supports in retracted position and a pressure system responsive to increased pressure in said bag for releasing said detents.

References Cited in the file of this patent

UNITED STATES PATENTS

| | | |
|---|---|---|
| 2,346,695 | Miller | Apr. 18, 1944 |
| 2,367,818 | Diehl | Jan. 23, 1945 |
| 2,376,330 | Dircksen et al. | May 22, 1945 |
| 2,380,587 | Fenton | July 31, 1945 |
| 2,809,366 | Van Boort et al. | Oct. 8, 1957 |
| 2,829,257 | Root | Apr. 1, 1958 |
| 2,891,195 | Smyth | June 16, 1959 |